(12) United States Patent
Jeon

(10) Patent No.: US 6,802,505 B2
(45) Date of Patent: Oct. 12, 2004

(54) MARKETING LOTTERY CARD AND ON LINE MARKETING METHOD USING THE SAME

(75) Inventor: Geon-Yong Jeon, 1-358, Bulkwang 1 dong, Eunpyung-gu, Seoul (KR), 122-846

(73) Assignees: Geon-Yong Jeon, Seoul (KR); Jeusworld Corp., Seoul (KR)

( * ) Notice: Subject to any disclaimer, the term of this patent is extended or adjusted under 35 U.S.C. 154(b) by 98 days.

(21) Appl. No.: 10/185,677

(22) Filed: Jun. 27, 2002

(65) Prior Publication Data

US 2003/0201604 A1 Oct. 30, 2003

(30) Foreign Application Priority Data

Apr. 25, 2002 (KR) ................................ 10-2002-0022799

(51) Int. Cl.[7] .................................................... A63F 3/06
(52) U.S. Cl. ........................ 273/139; 273/269; 283/901; 283/903
(58) Field of Search .............................. 273/269, 138.1, 273/139, 274; 463/16, 17, 40, 42; 283/901, 903

(56) References Cited

U.S. PATENT DOCUMENTS 6,296,900 B1 * 10/2001 Barnhart et al. ............ 427/145
6,398,643 B1 * 6/2002 Knowles et al. ............... 463/17
6,406,062 B1 * 6/2002 Brooks et al. ................ 283/92

FOREIGN PATENT DOCUMENTS

GB 2214823 * 9/1989

* cited by examiner

Primary Examiner—William M. Pierce
(74) Attorney, Agent, or Firm—Farjami & Farmaji LLP

(57) ABSTRACT

Disclosed are a marketing lottery card and an online marketing method using the card. The lottery card includes a matrix of rows and columns, and characters or gift symbols printed on the matrix. The on-line marketing method using the lottery card includes the steps of connecting a customer to a free gift-offering site, identifying whether the customer is a member of the site, displaying a pop-up window with a bingo confirmation table and an identification number input area, inputting an identification number of the card on the identification number input area, verifying the winning or losing status of the card by overlapping the card on the bingo confirmation table, displaying a result of the winning or losing status and requesting the customer to confirm the result, and displaying the contents of the free gift on the window and simultaneously transmitting the contents to the customer in real-time through an e-mail.

3 Claims, 3 Drawing Sheets

(a)

(b)  (c)

MARKETING LOTTERY CARD AND ON LINE MARKETING METHOD USING THE SAME

This application claims priority under 35 USC § 119 from Korean Application No. 10-2002-0022 filed in the Korean Patent Office on Apr. 25, 2002.

BACKGROUND OF THE INVENTION

1. Field of the Invention

The present invention relates to a marketing lottery card and an on-line marketing method using the marketing lottery card, and more particularly to a marketing lottery card providing a new profit model and an on-line marketing method using the marketing lottery card, thereby stimulating customer' interest, improving advertising and promotional effects, and creating an innovative profitability.

2. Description of the Related Art

Recently, as the number of users of various wireless communication networks including the Internet has increased tremendously, commercial activity through electronic commerce (EC) and purchases made using cyber cash have also increased. In order to keep up with these trends, on-line and/or off-line companies make a strenuous effort to open sites on the Internet in order to capture the attention of Internet customers and put forth all their energy to create various marketing methods in order to advertise articles for sale.

Among the various marketing methods, a method of capturing the attention of customers by offering a free gift has been popularly and widely used. This method is carried out via lotteries, quizzes, surveys, games, and so forth.

However, all the conventional marketing methods are already generalized, thereby not meeting a company's expectation and lowering the profits generated by the marketing activity. Accordingly, in order to overcome the aforementioned problem, an innovative profit model, which further stimulates customer' interest, has been demanded.

SUMMARY OF THE INVENTION

Therefore, the present invention has been made in view of the above problems, and it is an object of the present invention to provide a marketing lottery card, in which the winning or losing status of the marketing lottery card is verified by various advertisement mass media such as newsletters, magazines, and TV, thereby offering a customer several chances to receive a free gift and to enjoy a game of chance, stimulating a customer's interest, and maximizing advertising and promotional effects.

It is another object of the present invention to provide an on-line marketing method using the aforementioned marketing lottery card, which captures the attention of the customers via the Internet, thereby maximizing advertising and promotional effects and creating an innovative profitability.

In accordance with one aspect of the present invention, the above and other objects can be accomplished by the provision of a marketing lottery card made of a transparent film and being in a form of a mosaic puzzle. The marketing lottery card comprises a matrix of multiple rows and multiple columns, and characters or gift symbols, which are printed on the spaces of the matrix. Herein, the winning or losing status of the marketing lottery card is verified by overlapping the marketing lottery card on a bingo confirmation table provided on-line or off-line.

Alternatively, an incomplete figure may be printed throughout the multiple spaces of the marketing lottery card. Herein, the winning or losing status of the marketing lottery card is also verified by overlapping the marketing lottery card provided with the incomplete figure on the bingo confirmation table provided on-line or off-line.

Preferably, the marketing lottery card of the present invention may further comprise a scratch film for entirely or selectively coating the surfaces of the multiple spaces of the matrix. Herein, the customer scratches the film off the marketing lottery card, thereby first verifying the winning or losing status of the customer's marketing lottery card. Next, after the first verification of the winning or losing status of the marketing lottery card by scratching off the film, the customer overlaps the first-verified marketing lottery card on the bingo confirmation table of the pop-up window, thereby secondarily verifying the winning or losing status of the customer's marketing lottery card.

In accordance with another aspect of the present invention, there is provided an on-line marketing method using a marketing lottery card. The on-line marketing method comprises the steps of connecting a customer obtaining the marketing lottery card to a free gift-offering site, identifying whether the customer is a member of the site, displaying a pop-up window with a bingo confirmation table and an identification number input area, inputting an identification number of the marketing lottery card on the identification number input area, verifying the winning or losing status of the customer's marketing lottery card by overlapping the customer's marketing lottery card on the bingo confirmation table displayed on the pop-up window, displaying a result of the winning or losing status of the marketing lottery card on the window using the stored database, and requesting the customer to confirm the result, and displaying the contents of the free gift provided to the customer on the window and simultaneously transmitting the contents to the customer in real-time through an e-mail.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings.

Figure 1:
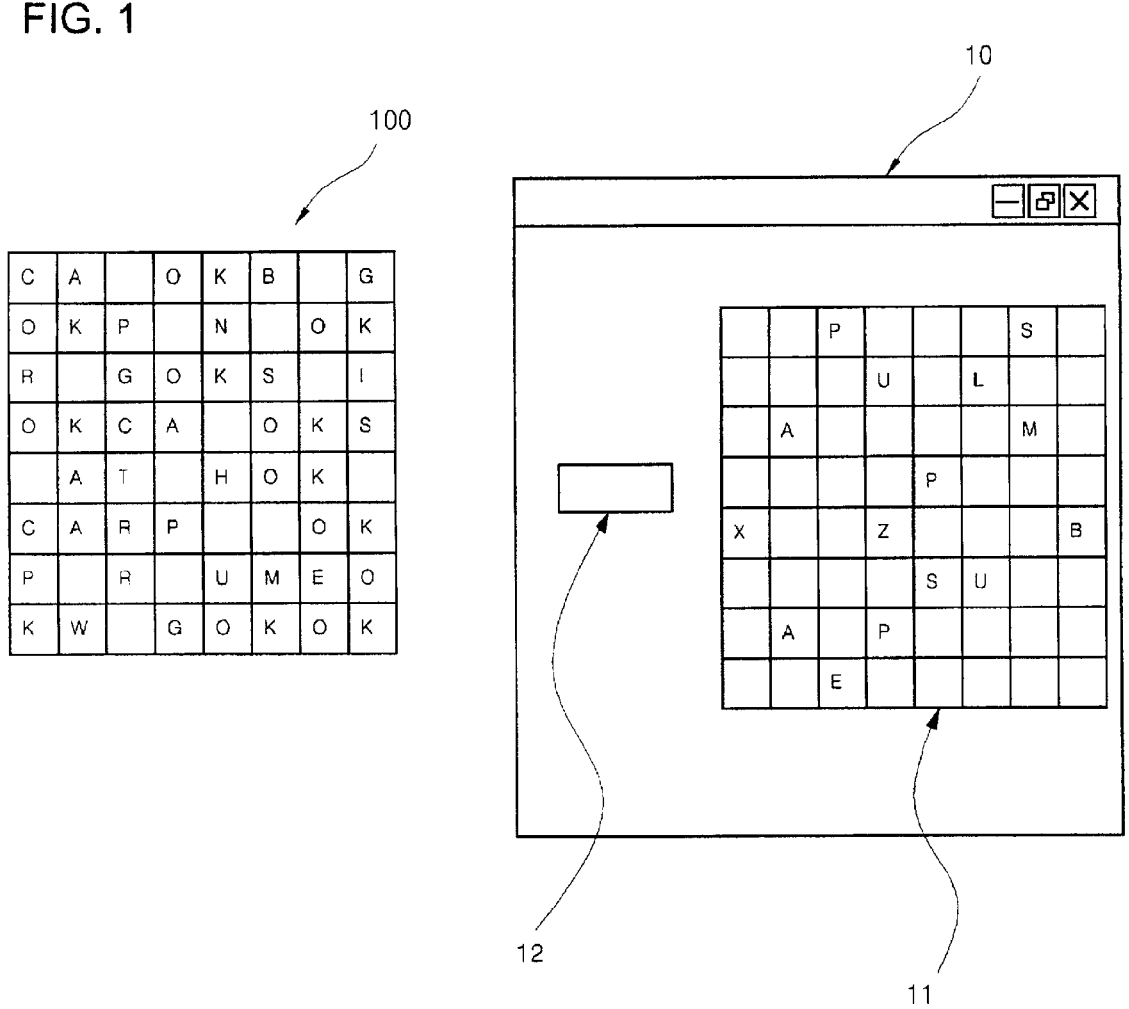
FIG. 1 is a schematic view showing an embodiment of a marketing lottery card and a pop-up window for verifying the winning or losing status of the marketing lottery card in accordance with the present invention.

FIG. 1 is a schematic view showing an embodiment of a marketing lottery card and a pop-up window for verifying the winning or losing status of the marketing lottery card in accordance with the present invention. FIGS. 2a through 2c are schematic views showing other embodiments of a marketing lottery card in accordance with the present invention, respectively.

As shown in FIG. 1, the marketing lottery card 100 of the present invention is in a form of a mosaic puzzle. That is, the marketing lottery card 100 comprises a matrix of multiple rows and multiple columns. A single character is printed on each space of the marketing lottery card 100. Several randomly selected spaces of the marketing lottery card 100 are blank. The winning or losing status of the customer's marketing lottery card 100 can be verified by overlapping the marketing lottery card 100 on a bingo confirmation table 11 provided via on-line or off-line. Herein, the bingo confirmation table 11 is presented on a pop-up window 10 provided through the Internet, but is not limited thereto. That is, the bingo confirmation table 11 may be provided by various advertisement mass media such as newsletters, magazines, and TV.

As shown in FIG. 2a, an incomplete figure may be drawn throughout the multiple spaces of the marketing lottery card 100. In this case, if one complete figure is formed by overlapping the customer's marketing lottery card 100 provided with the incomplete figure on the bingo confirmation table 11 of the pop-up window 10 provided via various mass media, the customer wins.

Further, as shown in FIG. 2b, a symbol of an offered free gift may be printed on designated spaces of the marketing lottery card 100. In this case, the winning or losing status of the customer's marketing lottery card 100 provided with the free gift symbols is also verified by overlapping the marketing lottery card 100 on the bingo confirmation table 11 of the pop-up window 10 provided via various mass media.

Then, as shown in FIG. 2c, a scratch film may be coated on the surfaces of characters, numbers, colors, marks, gift symbols, or an incomplete figure printed on the multiple spaces of the marketing lottery card 100. In this case, the customer scratches this film off the marketing lottery card 100, thereby first verifying the winning or losing status of the customer's marketing lottery card 100. Next, after the first verification of the winning or losing status of the marketing lottery card 100 by scratching off the film, the customer overlaps the first-verified marketing lottery card 100 on the bingo confirmation table 11 of the pop-up window 10 provided via various mass media, thereby secondarily verifying the winning or losing status of the marketing lottery card 100.

The marketing lottery card 100 may be manufactured so that the combination of characters, numbers, colors, marks, gift symbols, the incomplete figure and the scratch film are formed on the spaces of the matrix of the marketing lottery card 100. Moreover, new contents may be added to the combination of characters, numbers, colors, marks, gift symbols, the incomplete figure and the scratch film.

Preferably, the size of the aforementioned marketing lottery card 100 of the present invention is controlled so as to match with the bingo confirmation table 11 of the pop-up window 10 according to conditions of systems connected to the Internet, thereby easily verifying the winning or losing status of the marketing lottery card 100.

Hereinafter, an on-line marketing method using the aforementioned marketing lottery card 100 of the present invention is described in detail.

Figure 3:
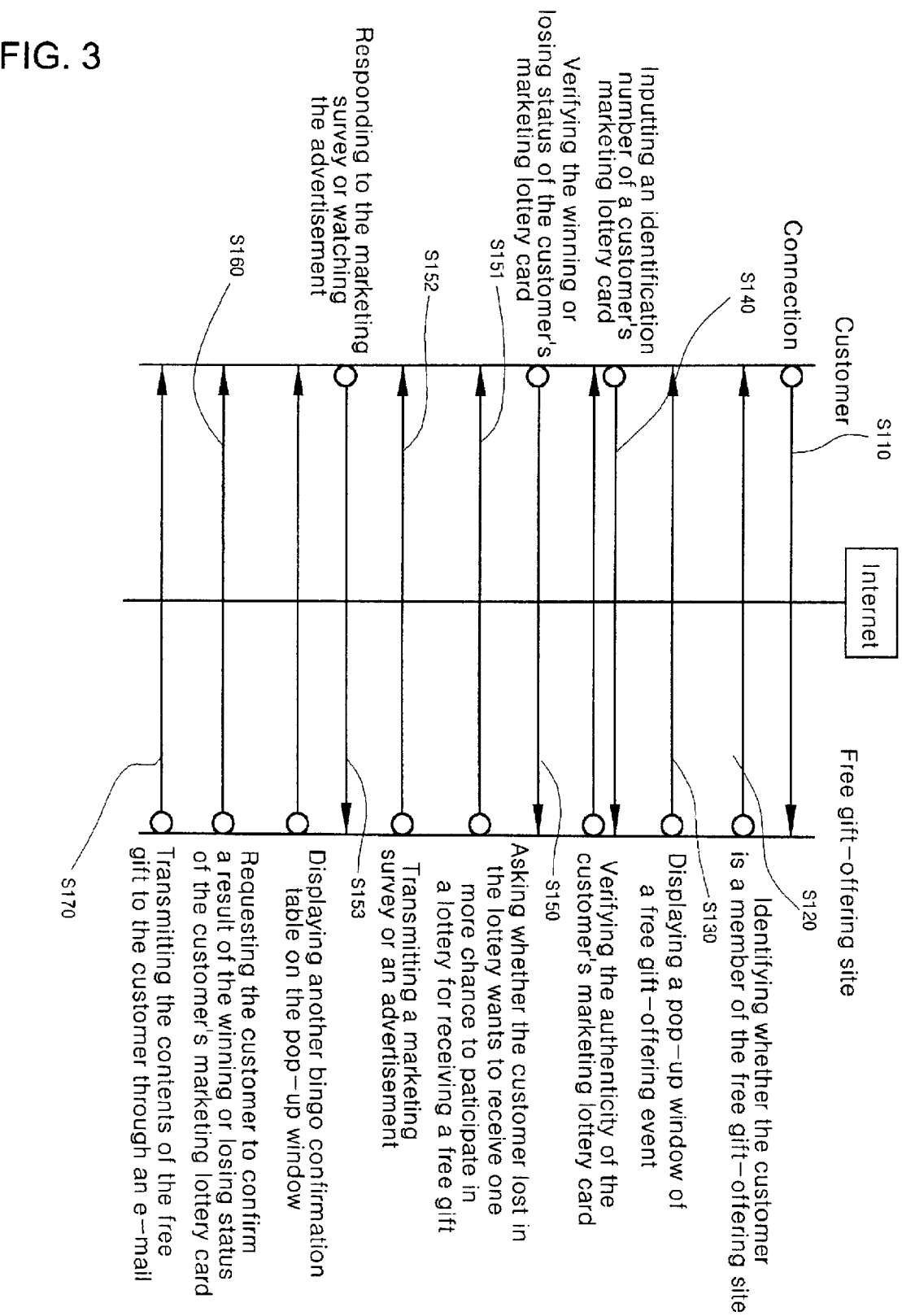
FIG. 3 is a flow chart illustrating an on-line marketing method using a marketing lottery card in accordance with the present invention.

FIG. 3 is a flow chart illustrating an on-line marketing method using a marketing lottery card in accordance with the present invention.

As shown in FIG. 3, the on-line marketing method using the marketing lottery card 100 of the present invention can be applied to all communication systems which connect customers to a free gift-offering site via the Internet. The free gift-offering site displays a window, verifies, stores, and changes various data through the stored database (D/B). Herein, the communication system refers to a personal computer or wireless mobile communication equipment such as a cellular phone, a personal digital assistant (PDA), or a pocket PC. The winning or losing status of the customer's marketing lottery card 100 can be verified by these communication systems.

Figure 2:
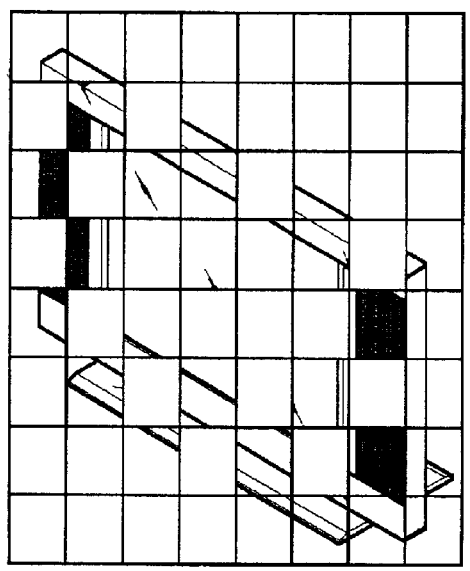
FIGS. 2a through 2c are schematic views showing other embodiments of a marketing lottery card in accordance with the present invention, respectively.
Figure 2:
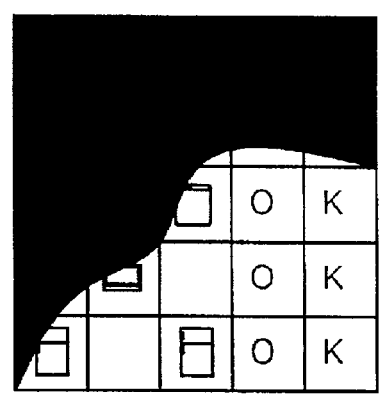

As shown in FIGS. 1 and 2, the marketing lottery card 100 is distributed to the public via on-line or off-line, and a customer obtaining the marketing lottery card 100 is connected to a free gift-offering site via the Internet (Silo). Herein, the marketing lottery card 100 may be distributed to the customers by various routes such as a free distribution, a distribution together with sold goods, an email distribution and so forth.

After being connected to the free gift-offering site, the customer selects a free gift-offering event. Then, the free gift-offering site identifies whether the customer is a member of this site or not (S120). Unless the customer is a member of the site, the customer is invited to join the site.

After identifying the customer using the stored database, the pop-up window 10 of the free gift-offering event is displayed as shown in FIG. 1 (S130). The pop-up window 10 comprises the bingo confirmation table 11 and a identification number input area 12.

The customer inputs an identification number of the obtained marketing lottery card 100 to the identification number input area 12 (S140). Herein, the free gift-offering site compares the inputted identification number of the customer's marketing lottery card 100 to the corresponding contents stored by the database, thereby verifying the authenticity of the customer's marketing lottery card 100.

Then, the customer overlaps his/her marketing lottery card 100 on the bingo confirmation table 11 displayed on the pop-up window 10 of the free gift-offering event, thereby verifying the winning or losing status of the customer's marketing lottery card 100 (S150). The winning or losing status of the marketing lottery card 100 is verified by the aforementioned overlapping of the marketing lottery card 100 with the bingo confirmation table 11. Therefore, the detailed description of the overlapping principle of the marketing lottery card 100 with the bingo confirmation table 11 is omitted.

After verifying the winning or losing status of the marketing lottery card 100 (S150), the free gift-offering site displays a result of the winning or losing status of the marketing lottery card 100 on the window 10 using the stored database and requests the customer to confirm this result (S160).

In case that the customer's marketing lottery card 100 is not winning status, the free gift-offering site asks whether the customer wants to receive one more chance to participate in a lottery for receiving a free gift (S151).

The customer who wants to receive one more chance to participate in the lottery for receiving the free gift is requested to respond to a designated marketing survey or to watch an advertisement for a designated time (S152–S153).

Another bingo confirmation table 11 is again displayed on the pop-up window 10 and provided to the customer, having provided the response to the survey or having watched the advertisement. The customer again overlaps his/her marketing lottery card 100 on the displayed bingo confirmation table 11, thereby verifying the winning or losing status of the marketing lottery card 100 one more time (S154).

After verifying the winning or losing status of the customer's marketing lottery card 100, the free gift-offering site displays the contents of the free gift provided to the customer on the window 10 and simultaneously transmits the contents to the customer in real-time through an e-mail (S170). At this time, the free gift-offering site transmits the contents of advertisements as well as the contents of the free gift provided to the customer.

As apparent from the above description, the present invention provides a marketing lottery card and an on-line marketing method using the marketing lottery card. In accordance with the present invention, the winning or losing status of the marketing lottery card is verified by various advertisement mass media such as newsletters, magazines, and TV, thereby offering a customer several chances to receive a free gift and to enjoy a game of chance, stimulating customer' interest, and maximizing advertising and promotional effects.

Further, the present invention captures the attention of the customers via an Internet marketing method using the marketing lottery card, thereby maximizing advertising and promotional effects and creating an innovative profitability.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An on-line marketing method using a marketing lottery card, said on-line marketing method comprising:

connecting a customer having a marketing lottery card to a free gift-offering site via the Internet;

identifying whether the customer is a member of the free gift-offering site;

displaying a pop-up window of a free gift-offering event, said pop-up window comprising a bingo confirmation table and an identification number input area;

inputting an identification number of the marketing lottery card on the identification number input area;

verifying the winning or losing status of the marketing lottery card by overlapping the marketing lottery card on the bingo confirmation table displayed on the pop-up window;

asking whether the customer wants to receive one more chances to participate in a lottery for receiving a free gift, in case that the marketing lottery card does not have the winning status;

requesting the customer, who wants to receive one more chances to participate in the lottery for getting the free gift, to respond to a designated marketing surveyor or watch an advertisement for a designated time;

again verifying the winning or losing status of the marketing lottery card one more time by overlapping the marketing lottery card on another bingo confirmation table, for only if the customer responds to the surveyor or watches the advertisement;

displaying a result of the winning or losing status of the marketing lottery card using a stored database after the verifying and the again verifying, and requesting the customer to confirm the result; and displaying the contents of the free gift provided to the customer and transmitting the contents to the customer via an e-mail.

2. The on-line marketing method as set forth in claim 1, wherein the marketing lottery card includes:

a matrix of multiple rows and multiple columns; and characters, numbers, colors, marks, gift symbols, an incomplete figure, or their combination, which are printed on spaces of the matrix;

wherein the on-line marketing method further comprising entirely or selectively coating surfaces of the characters, the numbers, the colors, the marks, the gift symbols, the incomplete figure, or their combination printed on the spaces of the matrix.

3. The on-line marketing method as set forth in claim 2, wherein the entirely or selectively coating is performed using a scratch film.

* * * * *